United States Patent
Nadeau et al.

(10) Patent No.: US 7,782,790 B1
(45) Date of Patent: Aug. 24, 2010

(54) EXTENSIONS TO THE PATH VERIFICATION PROTOCOL TO SUPPORT LINK BUNDLING CONSTRUCTS

(75) Inventors: Thomas D. Nadeau, Hampton, NH (US); George Leonard Swallow, Boston, MA (US); Danny Prairie, Kanata (CA); David D. Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 697 days.

(21) Appl. No.: 11/638,063

(22) Filed: Dec. 12, 2006

Related U.S. Application Data

(60) Provisional application No. 60/814,215, filed on Jun. 16, 2006.

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04L 12/28* (2006.01)

(52) U.S. Cl. ...................................... 370/252; 370/254
(58) Field of Classification Search ........................ None
See application file for complete search history.

(56) References Cited

U.S. PATENT DOCUMENTS

| | | | |
|---|---|---|---|
| 6,341,127 B1 * | 1/2002 | Katsube et al. | 370/352 |
| 6,697,329 B1 * | 2/2004 | McAllister et al. | 370/235 |
| 7,035,259 B2 * | 4/2006 | Nomura et al. | 370/392 |
| 7,072,346 B2 * | 7/2006 | Hama | 370/395.53 |
| 7,289,531 B2 * | 10/2007 | Van Den Bosch et al. | 370/466 |
| 7,363,534 B1 * | 4/2008 | Krishnamurthy et al. | 714/13 |
| 2003/0043821 A1 * | 3/2003 | Van Den Bosch et al. | 370/400 |
| 2003/0145105 A1 * | 7/2003 | Desineni et al. | 709/238 |
| 2005/0160171 A1 * | 7/2005 | Rabie et al. | 709/227 |
| 2006/0045007 A1 * | 3/2006 | Huck | 370/226 |

(Continued)

OTHER PUBLICATIONS

RFC 3031 MPLS Architecture Jan. 2001.*

(Continued)

*Primary Examiner*—Daniel J Ryman
*Assistant Examiner*—Christopher Crutchfield
(74) *Attorney, Agent, or Firm*—Brinks Hofer Gilson & Lione

(57) ABSTRACT

To reveal link bundles' component links in an MPLS network, transmit a sequence of request and reply packets. For a router receiving a request packet, the packet identifies that link bundles should be revealed, detect the link bundle links connected to the router, and for each, its component links are added to a downstream mapping field (DMF). A link bundle mapping field (LBMF) is also added to the request packet. Each LBMF specifies the component links of that link bundle by pointing to the component links added to the DMF. For a router responding to a request packet with a reply packet, determine if any links in the DMF are component links, and for each, identify a LBMF containing information regarding that link. Each component link in the DMF is processed. The component links in each LBMF are iterated through to ensure each matches the determined links in the DMF.

20 Claims, 9 Drawing Sheets

U.S. PATENT DOCUMENTS

2006/0198695 A1* 9/2006 Kano et al. .............. 403/408.1
2007/0008982 A1* 1/2007 Voit et al. ................... 370/401
2007/0025241 A1* 2/2007 Nadeau et al. ............. 370/229
2007/0207591 A1* 9/2007 Rahman et al. ............ 438/439

OTHER PUBLICATIONS

K. Kompella and G. Swallow, Detecting Multi-Protocol Label Switched (MPLS) Data Plane Failures, Network Working Group, RFC 4379, pp. 1-51.*

* cited by examiner

201 TRANSMIT A SEQUENCE OF REQUEST PACKETS AND REPLY PACKETS ALONG A SERIES OF LINKS IN A NETWORK, THE NETWORK COMPRISING A PLURALITY OF ROUTERS INTERCONNECTED BY LINKS, THE ROUTERS COMMUNICATE USING MULTIPROTOCOL LABEL SWITCHING, AND A LINK BETWEEN TWO ROUTERS MAY BE A LINK BUNDLE COMPRISING TWO OR MORE COMPONENT LINKS, WHEREIN A REQUEST PACKET REQUESTS INFORMATION ABOUT LINKS DOWNSTREAM FROM THE ROUTER THAT TRANSMITS THE REQUEST PACKET, AND WHEREIN A REPLY PACKET INCLUDES INFORMATION ABOUT LINKS DOWNSTREAM FROM THE ROUTER THAT TRANSMITS THE REPLY PACKET

202 FOR A ROUTER IN THE PLURALITY OF ROUTERS THAT RECEIVES A REQUEST PACKET AND IS CONNECTED TO DOWNSTREAM LINKS:

203 IDENTIFY THE REQUEST PACKET AS INDICATING THAT LINK BUNDLES SHOULD BE REVEALED

204 DETECT WHICH LINKS CONNECTED TO THE ROUTER ARE LINK BUNDLES

205 FOR EACH DETECTED LINK BUNDLE, ADD EACH COMPONENT LINK IN THE LINK BUNDLE TO A DOWNSTREAM MAPPING FIELD PRESENT IN THE REQUEST PACKET AND ADD A LINK BUNDLE MAPPING FIELD TO THE REQUEST PACKET, WHEREIN EACH LINK BUNDLE MAPPING FIELD SPECIFIES THE COMPONENT LINKS THAT COMPRISE THAT LINK BUNDLE BY POINTING TO THE COMPONENT LINKS ADDED TO THE DOWNSTREAM MAPPING FIELD

GO TO FIG. 2B STEP 206

FIG. 2A

FROM FIG. 2A STEP 202

206 FOR A ROUTER IN THE PLURALITY OF ROUTERS THAT RESPONDS TO A REQUEST PACKET WITH A REPLY PACKET THAT INCLUDES A DOWNSTREAM MAPPING FIELD AND AT LEAST ONE LINK BUNDLE MAPPING FIELD

207 DETERMINE IF ANY LINKS IDENTIFIED IN THE DOWNSTREAM MAPPING FIELD OF THE REPLY PACKET ARE COMPONENT LINKS THAT BELONG TO A LINK BUNDLE

208 FOR EACH SUCH DETERMINED LINK, IDENTIFY THAT A LINK BUNDLE MAPPING FIELD IN THE REPLY PACKET CONTAINS INFORMATION REGARDING THAT LINK

209 IF NOT, RETURN AN ERROR MESSAGE

210 IF SO, PROCESS EACH COMPONENT LINK IN THE DOWNSTREAM MAPPING FIELD AND ITERATE THROUGH THE COMPONENT LINKS IN EACH LINK BUNDLE MAPPING FIELD TO ENSURE EACH COMPONENT LINK IN EACH LINK BUNDLE MAPPING FIELD MATCHES THE DETERMINED LINKS IN THE DOWNSTREAM MAPPING FIELD

FIG. 2B

301 TRANSMIT A SEQUENCE OF REQUEST PACKETS AND REPLY PACKETS ALONG A SERIES OF LINKS IN A NETWORK, THE SERIES OF LINKS COMPRISING A PARTICULAR PATH ALONG WHICH PACKETS BELONGING TO A CLASS OF PACKETS TRAVELS, THE NETWORK COMPRISING A PLURALITY OF ROUTERS INTERCONNECTED BY LINKS, THE ROUTERS COMMUNICATE USING MULTIPROTOCOL LABEL SWITCHING, AND A LINK BETWEEN TWO ROUTERS MAY BE A LINK BUNDLE COMPRISING TWO OR MORE COMPONENT LINKS, WHEREIN A REQUEST PACKET REQUESTS INFORMATION ABOUT LINKS DOWNSTREAM FROM THE ROUTER THAT TRANSMITS THE REQUEST PACKET, AND WHEREIN A REPLY PACKET INCLUDES INFORMATION ABOUT LINKS DOWNSTREAM FROM THE ROUTER THAT TRANSMITS THE REPLY PACKET

302 FOR A ROUTER IN THE PLURALITY OF ROUTERS THAT RECEIVES A REQUEST PACKET AND IS CONNECTED TO DOWNSTREAM LINKS:

303 IDENTIFY THE REQUEST PACKET AS INDICATING THAT LINK BUNDLES SHOULD BE REVEALED

304 DETECT WHICH LINKS CONNECTED TO THE ROUTER ARE LINK BUNDLES

305 FOR EACH DETECTED LINK BUNDLE, ADD EACH COMPONENT LINK IN THE LINK BUNDLE TO A DOWNSTREAM MAPPING FIELD PRESENT IN THE REQUEST PACKET AND ADD A LINK BUNDLE MAPPING FIELD TO THE REQUEST PACKET, WHEREIN EACH LINK BUNDLE MAPPING FIELD SPECIFIES THE COMPONENT LINKS THAT COMPRISE THAT LINK BUNDLE BY POINTING TO THE COMPONENT LINKS ADDED TO THE DOWNSTREAM MAPPING FIELD

311 FOR EACH DETECTED LINK BUNDLE, SPECIFY IN THE LINK BUNDLE MAPPING FIELD AN ALGORITHM USED BY THAT LINK BUNDLE

GO TO FIG. 3B STEP 306

FIG. 3A

401 TRANSMIT A SEQUENCE OF REQUEST PACKETS AND REPLY PACKETS ALONG A SERIES OF LINKS IN A NETWORK, THE NETWORK COMPRISING A PLURALITY OF ROUTERS INTERCONNECTED BY LINKS, THE ROUTERS COMMUNICATE USING MULTIPROTOCOL LABEL SWITCHING, AND A LINK BETWEEN TWO ROUTERS MAY BE A LINK BUNDLE COMPRISING TWO OR MORE COMPONENT LINKS, WHEREIN A REQUEST PACKET REQUESTS INFORMATION ABOUT LINKS DOWNSTREAM FROM THE ROUTER THAT TRANSMITS THE REQUEST PACKET, AND WHEREIN A REPLY PACKET INCLUDES INFORMATION ABOUT LINKS DOWNSTREAM FROM THE ROUTER THAT TRANSMITS THE REPLY PACKET

402 FOR A ROUTER IN THE PLURALITY OF ROUTERS THAT RECEIVES A REQUEST PACKET AND IS CONNECTED TO DOWNSTREAM LINKS:

403 IDENTIFY THE REQUEST PACKET AS INDICATING THAT LINK BUNDLES SHOULD BE REVEALED

404 DETECT WHICH LINKS CONNECTED TO THE ROUTER ARE LINK BUNDLES

405 FOR EACH DETECTED LINK BUNDLE, ADD EACH COMPONENT LINK IN THE LINK BUNDLE TO A DOWNSTREAM MAPPING FIELD PRESENT IN THE REQUEST PACKET AND ADD A LINK BUNDLE MAPPING FIELD TO THE REQUEST PACKET, WHEREIN EACH LINK BUNDLE MAPPING FIELD SPECIFIES THE COMPONENT LINKS THAT COMPRISE THAT LINK BUNDLE BY POINTING TO THE COMPONENT LINKS ADDED TO THE DOWNSTREAM MAPPING FIELD

411 ADD EACH COMPONENT LINK IN THE LINK BUNDLE TO A DOWNSTREAM MAPPING FIELD PRESENT IN THE REQUEST PACKET

412 SET A FLAG IN THE DOWNSTREAM MAPPING FIELD THAT IDENTIFIES THE LINK AS A COMPONENT LINK THAT IS PART OF A LINK BUNDLE

GO TO FIG. 4B STEP 406

FIG. 4A

FROM FIG. 4A STEP 402

406 FOR A ROUTER IN THE PLURALITY OF ROUTERS THAT RESPONDS TO A REQUEST PACKET WITH A REPLY PACKET THAT INCLUDES A DOWNSTREAM MAPPING FIELD AND AT LEAST ONE LINK BUNDLE MAPPING FIELD

407 DETERMINE IF ANY LINKS IDENTIFIED IN THE DOWNSTREAM MAPPING FIELD OF THE REPLY PACKET ARE COMPONENT LINKS THAT BELONG TO A LINK BUNDLE

413 DETERMINE IF ANY LINKS IDENTIFIED IN THE DOWNSTREAM MAPPING FIELD OF THE REPLY PACKET ARE COMPONENT LINKS THAT BELONG TO A LINK BUNDLE BY EXAMINING THE FLAG OF EACH LINK

408 FOR EACH SUCH DETERMINED LINK, IDENTIFY THAT A LINK BUNDLE MAPPING FIELD IN THE REPLY PACKET CONTAINS INFORMATION REGARDING THAT LINK

409 IF NOT, RETURN AN ERROR MESSAGE

410 IF SO, PROCESS EACH COMPONENT LINK IN THE DOWNSTREAM MAPPING FIELD AND ITERATE THROUGH THE COMPONENT LINKS IN EACH LINK BUNDLE MAPPING FIELD TO ENSURE EACH COMPONENT LINK IN EACH LINK BUNDLE MAPPING FIELD MATCHES THE DETERMINED LINKS IN THE DOWNSTREAM MAPPING FIELD

414 SET A MULTIPATH FIELD TO IDENTIFY HOW TRAFFIC IS TO BE CARRIED BY THE COMPONENT LINK THAT IS PART OF A LINK BUNDLE

| MTU | Address Type | DS Flags |
|---|---|---|
| Downstream IP Address (4 or 16 octets) | | |
| Downstream Interface Address (4 or 16 octets) | | |
| Multipath Type | Reserved | Multipath Length |

. .
. (Multipath Information) .
. .

| Component Interface Address | Protocol |
|---|---|
| Component Interface's Downstream Map TLV index | |

.
.
.

| Component Interface Address | Protocol |
|---|---|
| Component Interface's Downstream Map TLV index | |

FIG. 6

EXTENSIONS TO THE PATH VERIFICATION PROTOCOL TO SUPPORT LINK BUNDLING CONSTRUCTS

RELATED APPLICATIONS

This application claims priority to U.S. Provisional Patent Application Ser. No. 60/814,215, filed on Jun. 16, 2006, the entire teachings of which are incorporated by reference.

BACKGROUND

Link bundling is a technology that allows a device to group or bundle together multiple, dislike or like interfaces (referred to as component interfaces or links) that connect one router/switch to another under the umbrella of a single, virtual link bundle interface. This interface is then viewed by the device as a single pipe to that adjacent neighbor, consisting of the combined bandwidth and other attributes of the component links. For example, a single set of transmit and receive counters reflect the aggregate behavior of the individual component links, and provide a single point of management for the operator. This interface may also be introduced as a single interface to that neighbor to the routing protocols in place of the operator having to worry about attaching each individual component interface to the routing protocol(s). The routing protocols will then instruct the forwarding plane to forward all traffic destined for a particular next-hop to use the single virtual link bundling interface. However, under the covers, traffic will be load-shared across all component links in order to best share the combined bandwidth of all adjacent links. The algorithm used to share traffic across component links is identical to the one used for spreading the load across adjacent Interior Gateway Protocol (IGP) equal cost links, often referred to as Equal Cost Multi-Path (ECMP). The most common algorithms are: 1) per-packet, which uses some form of round-robin scheduling to push each packet over a different component link or 2) per-destination, which sends all packets destined to a particular IP destination over the same component link. There are advantages and disadvantages to using either algorithm, but the most commonly used algorithm is the per-destination algorithm.

Link bundles provide an optimization on link management for operators that may simplify their configuration and management of the Interior Gateway Protocol (IGP). One advantage is that the links need not be of the same access speed, media type, or otherwise related, just that they attach to the same routed neighbor. In most cases, this means physically connected routing neighbors. This allows the operator to upgrade or move adjacent links without having to worry much about capacity planning. Link bundling may also provide a non-stop forwarding capability whereby component links are removed or added to a virtual link bundle interface without disrupting the routing protocol, which in normal cases might occur when links are disabled. Link bundles also provide an optimization that simplifies (shortens) the number of Link State Advertisements (LSAs) that need to be sent around during routing updates, making routing updates faster.

SUMMARY

One issue with conventional link bundles is that when observed directly, they provide no insight into the load-sharing behavior being employed to distribute traffic over the component links. Under normal operating conditions, this hiding of information is actually desired and considered a benefit. However, when something goes wrong over the component links, the opaqueness of the virtual interface makes troubleshooting cumbersome or impossible, and at best, requires much operational inspection to determine the point of failure.

The present invention overcomes this issue by specifying extensions to the tracing functions of the Path Verification Protocol (PVP), as well as those of the corresponding embodiment of PVP in Multiprotocol Label Switching (MPLS) Label Switch Path (LSP) Ping's tracing function as specified in Internet Engineering Task Force (IETF) Request for Comments (RFC) 4379. In particular, the echo request packet format is extended to include a new LinkBundle Type-Length-Value (TLV) that will contain both the virtual link bundle interface ID, as well as a description of the ECMP algorithm used by that interface. The existing downstream mapping processing algorithm for midpoint routers is modified to specify that when link bundles are encountered, the component links should be revealed in the same way that non-component links are revealed in the existing algorithm. The error processing algorithm will also be modified to indicate that a component of a virtual link bundle interface has failed. The presence of the LinkBundle TLV will indicate that a link bundle virtual interface is associated with those component links, and that special processing and consideration at the head-end Label Switch Router (LSR) of the LSP should be taken when processing this information. The head-end LSR's processing algorithm is modified to understand the new aforementioned LinkBundle TLV, as well as to modify its processing algorithm for how it investigates the LSP's tree when tracing either the entire tree using ECMP tree trace, or tracing a single path (also known as a path selector) of the LSP.

More particularly, in an embodiment there is provided a method of identifying component links to assist in error analysis of failed links in a network. The network includes a plurality of routers and links interconnecting the plurality of routers, wherein the routers communicate using multiprotocol label switching, and wherein a link between two routers may be a link bundle comprising two or more component links. The method includes, for each router in the plurality of routers that receives a request packet, the request packet requesting information about links downstream from that router, identifying the request packet as indicating that link bundles should be revealed; detecting which links connected to the router are link bundles; and for each detected link bundle, adding each component link in the link bundle to a downstream mapping field present in the request packet and adding a link bundle mapping field to the request packet, wherein each link bundle mapping field specifies the component links that comprise that link bundle by pointing to the component links added to the downstream mapping field. For each router in the plurality of routers that prepares a reply packet in response to a request packet, the reply packet including a downstream mapping field and at least one link bundle mapping field, the method includes determining if any links identified in the downstream mapping field of the reply packet are component links that belong to a link bundle; for each such determined link, identifying that a link bundle mapping field in the reply packet contains information regarding that link, and if not, returning an error message; if yes, processing each component link in the downstream mapping field and iterating through the component links in each link bundle mapping field to ensure each component link in each link bundle mapping field matches the determined links in the downstream mapping field. In a related embodiment, the method may include, for each detected link bundle, specifying in the link bundle mapping field an algorithm used by that link bundle.

In another related embodiment, the method may include determining if the router sending the reply packet is a destination for packets belonging to a class of packets sent along a particular path to the router; and if so, removing all link bundling mapping fields from the reply packet. In yet another related embodiment, transmitting may include transmitting a sequence of request packets and reply packets along a series of links in the network, the series of links comprising a particular path along with packets belonging to a class of packets travels, wherein a request packet requests information about links downstream from the router that transmits the request packet, and wherein a reply packet includes information about links downstream from the router that transmits the reply packet.

In another related embodiment, for each detected link bundle, adding each component link may include adding each component link in the link bundle to a downstream mapping field present in the request packet; and setting a flag in the downstream mapping field that identifies the link as a component link that is part of a link bundle.

In a further related embodiment, determining may include determining if any links identified in the downstream mapping field of the reply packet are component links that belong to a link bundle by examining the flag of each link. In another further related embodiment, the method may include setting a multipath field to identify how a traffic is to be carried by the component link that is part of a link bundle.

In another embodiment there is provided a router for identifying component links, wherein two or more component links comprise a link bundle and wherein link bundles may be links interconnecting routers in a network comprising a plurality of router. The router includes a network interface coupled to other routers; a memory operable to store instructions and data, the memory in communication with the network interface; and an execution unit coupled to the memory, the execution unit in communication with the network interface and with the data and responsive to the instructions. The memory is encoded with a link bundle revealing application, that when executed in the execution unit, provides a link bundle revealing process that performs operations of: when receiving a request packet, the request packet requesting information about links downstream from that router: identifying the request packet as indicating that link bundles should be revealed; detecting which links connected to the router are link bundles; and for each detected link bundle, adding each component link in the link bundle to a downstream mapping field present in the request packet and adding a link bundle mapping field to the request packet, wherein each link bundle mapping field specifies the component links that comprise that link bundle by pointing to the component links added to the downstream mapping field; and when preparing a reply packet in response to a request packet, the reply packet including a downstream mapping field and at least one link bundle mapping field: determining if any links identified in the downstream mapping field of the reply packet are component links that belong to a link bundle; for each such determined link, identifying that a link bundle mapping field in the reply packet contains information regarding that link, and if not, returning an error message; if yes, processing each component link in the downstream mapping field and iterating through the component links in each link bundle mapping field to ensure each component link in each link bundle mapping field matches the determined links in the downstream mapping field.

In another embodiment there is provided a computer program product, stored on a computer readable medium to identify component links to assist in error analysis of failed links in a network. The network includes a plurality of routers and links interconnecting the plurality of routers, wherein the routers communicate using multiprotocol label switching, and wherein a link between two routers may be a link bundle comprising two or more component links. The computer program product includes, for each router in the plurality of routers that receives a request packet, the request packet requesting information about links downstream from that router: computer program code for identifying the request packet as indicating that link bundles should be revealed; computer program code for detecting which links connected to the router are link bundles; and for each detected link bundle, computer program code for adding each component link in the link bundle to a downstream mapping field present in the request packet and computer program code for adding a link bundle mapping field to the request packet, wherein each link bundle mapping field specifies the component links that comprise that link bundle by pointing to the component links added to the downstream mapping field. The computer program product also includes, for each router in the plurality of routers that prepares a reply packet in response to a request packet, the reply packet including a downstream mapping field and at least one link bundle mapping field: computer program code for determining if any links identified in the downstream mapping field of the reply packet are component links that belong to a link bundle; for each such determined link, computer program code for identifying that a link bundle mapping field in the reply packet contains information regarding that link, and if not, computer program code for returning an error message; if yes, computer program code for processing each component link in the downstream mapping field and computer program code for iterating through the component links in each link bundle mapping field to ensure each component link in each link bundle mapping field matches the determined links in the downstream mapping field.

Arrangements of the invention involving a computer program product are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations may be installed onto a computerized device to cause one or more processors in the computerized device to perform the techniques explained herein as embodiments of the invention. Software processes that operate in a collection of computerized devices, such as in a group of data communications devices or other entities may also provide the system of the invention. The system of the invention may be distributed between many software processes on several data communications devices, or all processes could run on a small set of dedicated computers, or on one computer alone.

It is to be understood that the embodiments of the invention may be embodied strictly as a software program, as software and hardware, or as hardware and/or circuitry alone, such as within a data communications device. The features of the invention, as explained herein, may be employed in data communications devices and/or software systems for such devices such as those manufactured by Cisco Systems, Inc. of San Jose, Calif.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 2A-2B illustrate a flowchart of a procedure performed by the router depicted in FIG. 1 when revealing link bundles to determine where an error exists in a network including link bundles.

FIGS. 3A-3B illustrate a flowchart of a procedure preformed by the router depicted in FIG. 1 when revealing link bundles and identifying an algorithm used in connection with the formation of the link bundles.

FIGS. 4A-4B illustrate a flowchart of a procedure preformed by the router depicted in FIG. 1 when revealing link bundles and identifying link bundles by use of a flag.

FIG. 6 is an example of the Value field of a Downstream Mapping Link Bundle TLV field in a packet used by the router depicted in FIG. 1.

DETAILED DESCRIPTION

Though hiding the component links that make up a link bundle has advantages, during troubleshooting, it is valuable to know when a link is actually a link bundle. One way to reveal link bundles is to specify the component interfaces in the downstream map TLV, and to specify the virtual interface in an extension Downstream Map Link Bundle TLV. In addition to the virtual link bundle interface, the component interfaces are specified again in this TLV as a way of matching up the component interfaces with the virtual interface. The advantage of this approach is that it will be backwards compatible with existing implementations of RFC 4379 in that the sending router will still receive a list of interfaces in the downstream map TLV as it did before, and because the two-stage hash is taken into account in the downstream map TLV's multipath information, the routers may do their computations as they currently do without loss of generality.

Generally, disclosed embodiments specifies extensions to the tracing functions of the Path Verification Protocol, as well as those of the corresponding embodiment of PVP in MPLS LSP Ping's tracing function as specified in IETF RFC4379. In particular, the echo request packet format is extended to include a new LinkBundle TLV that will contain both the virtual link bundle interface ID, as well as a description of the ECMP algorithm used by that interface. The existing downstream mapping processing algorithm for midpoints is modified to specify that when link bundles are encountered, the component links should be revealed as would non-component links in the existing algorithm.

Figure 1:
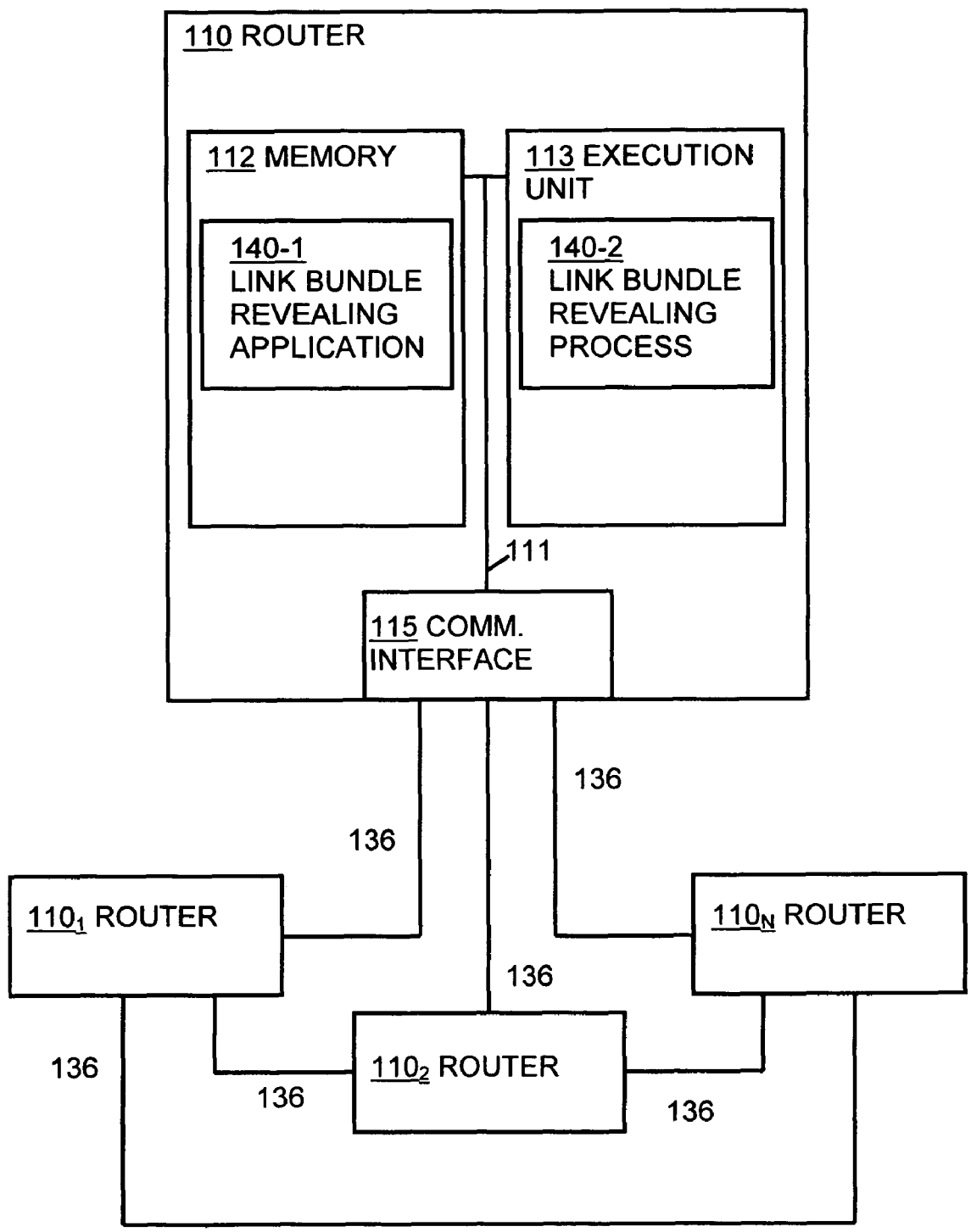
FIG. 1 illustrates an example router architecture for a router according to one embodiment disclosed herein.

More particularly, FIG. 1 is a block diagram illustrating an example architecture of a router 110 that executes, runs, interprets, operates or otherwise performs an link bundle revealing application 140-1 and a link bundle revealing process 140-2 suitable for use in explaining example configurations disclosed herein. As shown in this example, the router 110 includes an interconnection mechanism 111 such as a data bus or other circuitry that couples a memory system 112, an execution unit 113, and at least one communications interface 115. The communications interface 115 enables the router 110 to communicate with other routers $110_1, 110_2, \ldots 110_N$ via links 136. The routers 110, $110_1, 110_2, \ldots 110_N$, and the links 136 may form a network, though the exact configuration of the network may differ from that shown in FIG. 1, which is provided solely as an example.

The memory system 112 is any type of computer readable medium and in this example is encoded with a link bundle revealing application 140-1 that includes link bundle revealing process 140-2. The link bundle revealing application 140-1 may be embodied as software code such as data and/or logic instructions (e.g., code stored in the memory system 112 or on another computer readable medium such as a removable disk) that supports processing functionality according to different embodiments described herein. During operation of the router 110, the execution unit 113 accesses the memory system 112 via the interconnection mechanism 111 in order to launch, run, execute, interpret or otherwise perform the logic instructions of the link bundle revealing application 140-1. Execution of the link bundle revealing application 140-1 in this manner produces processing functionality in a link bundle revealing process 140-2. In other words, the link bundle revealing process 140-2 represents one or more portions or runtime instances of the link bundle revealing application 140-1 performing or executing within or upon the execution unit 113 in the router 110 at runtime.

It is noted that example configurations disclosed herein include the link bundle revealing application 140-1 itself including the link bundle revealing process 140-2 (i.e., in the form of un-executed or non-performing logic instructions and/or data). The link bundle revealing application 140-1 may be stored on a computer readable medium (such as a floppy disk), hard disk, electronic, magnetic, optical or other computer readable medium. The link bundle revealing application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the link bundle revealing application 140-1 in the execution unit 113 as the link bundle revealing process 140-2. Those skilled in the art will understand that the router 110 may include other processes and/or software and hardware components, such as an operating system not shown in this example.

Figure 3B:
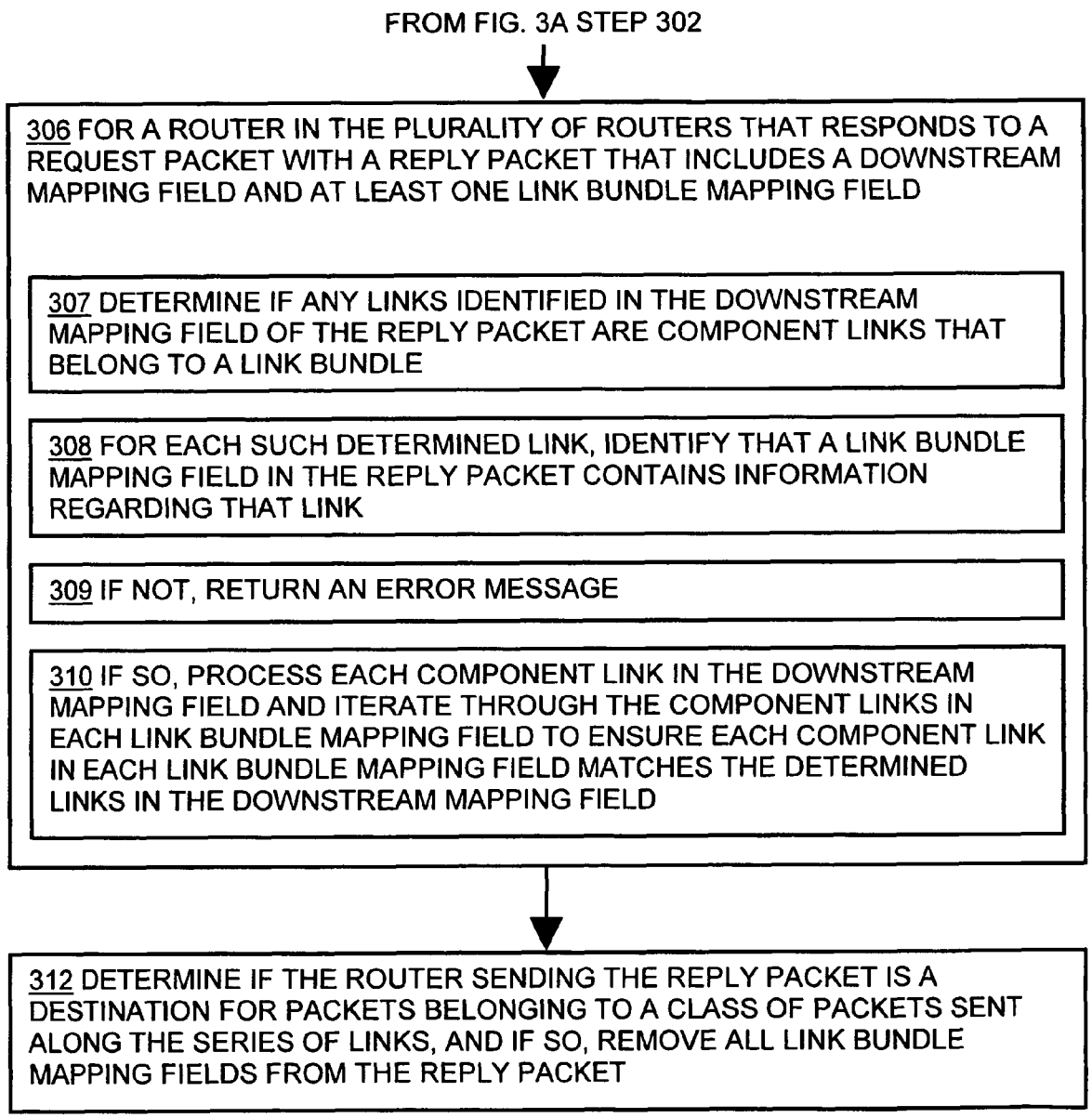

A number of flowcharts of the presently disclosed method are illustrated in FIGS. 2-4. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flowcharts do not depict the syntax of any particular programming language. Rather, the flowcharts illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

More specifically, FIGS. 2-4 illustrate flowcharts of a method to reveal link bundles when troubleshooting errors in a network that may include link bundles. Such a network may comprise a plurality of routers 110, $110_1$, $110_2$, . . . $110_N$ and links 136 interconnecting the plurality of routers 110, $110_1$, $110_2$, . . . $110_N$, an example of which is shown in FIG. 1 The routers communicate using multiprotocol label switching. One or more of the links 136 interconnecting two routers may be a link bundle that is composed of two or more component links. To reveal whether any component links are present, a sequence of request packets and reply packets is transmitted along a series of links in the network, step 201/step 401. The series of links may be a particular path along which packets belonging to a class of packets travels, step 301. A request packet requests information about links downstream from the router that transmits the request packet, and a reply packet includes information about links downstream from the router that transmits the reply packet.

A router that receives a request packet and is connected to downstream links, step 202/step 302/step 402, performs the following steps. First, the router identifies the request packet as indicating that link bundles should be revealed, step 203/step 303/step 403. The router then detects which links connected to the router are link bundles, step 204/step 304/step 404. For each detected link bundle, each component link in the link bundle is added to a downstream mapping field present in the request packet, and a link bundle mapping field is added to the request packet, wherein each link bundle mapping field specifies the component links that comprise that link bundle by pointing to the component links added to the downstream mapping field, step 205/step 305/step 405. For each detected link bundle, in the link bundle mapping field an algorithm used by that link bundle may be specified, step 311. After component links are added to a downstream mapping field present in the request packet, step 411, a flag in the downstream mapping field may be set that identifies the link as a component link that is part of a link bundle, step 412.

A router that responds to a request packet with a reply packet, step 206/step 306/step 406, where the reply packet includes a downstream mapping field and at least one link bundle mapping field performs the following steps. First, the router determines if any links identified in the downstream mapping field of the reply packet are component links that belong to a link bundle, step 207/step 307/step 407. The router may determine if any links identified in the downstream mapping field of the reply packet are component links that belong to a link bundle by examining the flag of each link, step 413. For each such determined link, the router identifies that a link bundle mapping field in the reply packet contains information regarding that link, step 208/step 308/step 408. If not, the router returns an error message, step 209/step 309/step 409. If the link bundle mapping field does contain information regarding that link, the router processes each component link in the downstream mapping field and iterates through the component links in each link bundle mapping field to ensure each component link in each link bundle mapping field matches the determined links in the downstream mapping field, step 210/step 310/step 410. If the router sending the reply packet is a destination for packets belonging to a class of packets sent along the series of links, then all link bundle mapping fields are removed from the reply packet, step 312. The router may also set a multipath field to identify how traffic is to be carried by the component link that is part of a link bundle, step 414.

In other words, at the receiver of an Echo Request containing a Downstream Map TLV, first, when encoding the downstream map TLV, and encountering a link bundle virtual interface, recurse through to each one of its component link interfaces and include those (their IP address and IfNumber) in the Downstream Map TLV. For each one included, also set the DS Flag to indicate that it is a component link interface. When specifying the ECMP algorithm, use both algorithms to process the component interfaces. That is, run the ECMP algorithm twice, once using the virtual link bundle interface as the next-hop, and then again through that interface to the component link bundle interfaces. In most cases, the ECMP algorithm used for the link bundles will be identical to the one used to get from the link bundle interface to the component interfaces, and may be run twice by the control plane. Next, include one copy of the Downstream Map Link Bundle TLV for each link bundle virtual interface. For each TLV, fill in the component links herein to "point" back at the link bundle component links specified above.

At the sender of an Echo Reply containing a Downstream Map TLV, first ensure that for each Downstream Map TLV containing an interface with the DS Flag of "L" set, verify that a Downstream Map Link Bundle TLV exists that contains this interface, or return an error. Older versions of code will ignore this flag. Then, for each component interface present in the Downstream Mapping TLV, process as normal. This facilitates backwards compatibility with older code. For each Downstream Map Link Bundle TLV, iterate through the component interfaces specified therein, and ensure they match the ones specified in the Downstream Map TLV discussed above.

In order to completely explain the changes required by the addition of the Downstream Mapping Link Bundle TLV, RFC 4379 will need to be modified to include a new packet format interpretation. These modifications are described in detail below.

The description of interfaces in Section 3.3. "Downstream Mapping" must be changed to reflect each set of link bundle component interfaces belonging to a link bundle. The Address Type indicates if the interface is numbered or unnumbered. It also determines the length of the Downstream IP Address and Downstream Interface fields. The resulting total for the initial part of the TLV is described below as "K Octets".

In the case where the interface is a virtual link bundle interface, the LSR must include its component interfaces addresses here and must not include the virtual link bundle. It must also indicate that it is a component link by setting the L bit in the DS Flags. Under this condition, the LSR must then include a corresponding LinkBundle TLV, described below, to indicate which component interfaces are associated with which component links returned in the Downstream Map TLV.

Figure 5:
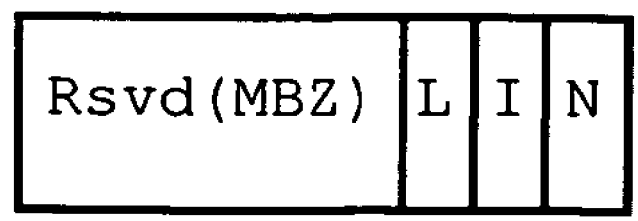
FIG. 5 is an example of the DS Flags field in a packet used by the router depicted in FIG. 1.

The DS Flags field is an eight-bit vector with a format as shown in FIG. 5. Three flags are currently defined: I, N and L. The remaining flags must be set to zero when sending and ignored on receipt. The L flag stands for "Link Bundle Component Interface". When this flag is set, it indicates that the interface indicated in the Downstream Interface Address field is a member of a link bundle, in other words, a component link bundle interface.

Address or label values are encoded according to the Multipath Type. In the case where the L bit is set in the DS Flags, the multipath information must also be set to reflect the multipath address or label value encoding that link bundle interface will use to load share traffic onto this component interface. The parameters used to get traffic from the inbound interface to the link bundle virtual interface will be described below.

The protocol identifier field should have a value of 5, representing Link Bundle Component Interface, in the case where a link bundle's component interface is specified (as indicated by DS Flag L).

The Downstream Mapping Link Bundle object is a TLV that should not be included in an echo request message. The Downstream Mapping Link Bundle TLV is used to specify the link bundle virtual interface, as well as which link bundle virtual interface corresponds to which link bundle component interfaces that were specified in the Downstream Mapping TLV. If the replying router is the destination of the FEC, then a Downstream Mapping Link Bundle TLV should not be included in the Echo Reply. Otherwise, the replying router must include a Downstream Mapping Link Bundle TLV for each link bundle virtual interface over which this FEC could be forwarded. Furthermore, this TLV will be present once for every Downstream Mapping TLV present that contains a DS Flag set to L.

The Length of a Downstream Mapping TLV is K+M+4*N octets, where M is the Multipath Length, N is the number of Downstream Labels, and Values for K are found in the description of Address Type below. The Value field of a Downstream Mapping Link Bundle TLV (DMLB TLV) has a format as shown in FIG. 6.

The Maximum Transmission Unit (MTU) is the size in octets of the largest MPLS frame (including label stack) that fits on the virtual interface to the Downstream LSR.

The Address Type indicates if the virtual interface is numbered or unnumbered. It also determines the length of the Downstream IP Address and Downstream Interface fields. The resulting total for the initial part of the TLV is listed below as "K Octets". The Address Type is set to one of the following values. Type #1 has an Address Type of IPv4 Numbered and a K Octets value of 16. Type #2 has an Address Type of IPv4 Unnumbered and a K Octets value of 16. Type #3 has an Address Type of IPv6 Numbered and a K Octets value of 40. Type #4 has an Address Type of IPv6 Unnumbered and a K Octets value of 28.

Figure 7:
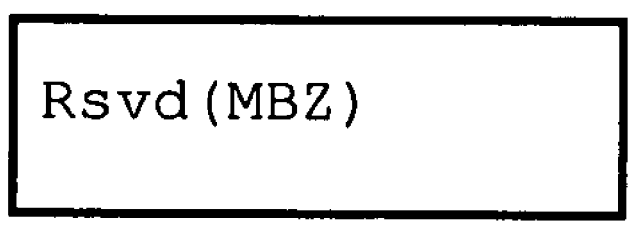
FIG. 7 is an example of another DS Flags field in a packet used by the router depicted in FIG. 1.

The DS Flags field is an eight-bit vector with a format as shown in FIG. 7. All flags are reserved for future use and must be set to zero when sending and ignored on receipt.

IPv4 addresses and interface indices are encoded in 4 octets; IPv6 addresses are encoded in 16 octets. If the link bundle component interface to the downstream LSR is numbered, then the Address Type MUST be set to IPv4 or IPv6, the Downstream IP Address must be set to either the downstream LSR's Router ID or the interface address of the downstream LSR, and the Downstream Interface Address must be set to the downstream LSR's interface address. The interface index is set to the value assigned by the LSR.

If the link bundle interface to the downstream LSR is unnumbered, the Address Type must be IPv4 Unnumbered or IPv6 Unnumbered, the Downstream IP Address must be the downstream LSR's Router ID, and the Downstream Interface Address must be set to the interface index assigned by the upstream LSR to the interface.

If an LSR does not know the IP address of its neighbor, then it must set the Address Type to either IPv4 Unnumbered or IPv6 Unnumbered. For IPv4, it must set the Downstream IP Address to 127.0.0.1; for IPv6 the address is set to 0::1. In both cases, the interface index must be set to 0. If an LSR receives an Echo Request packet with either of these addresses in the Downstream IP Address field, this indicates that it must bypass interface verification but continue with label validation.

If the originator of an Echo Request packet wishes to obtain Downstream Mapping Link Bundle information but does not know the expected label stack, then it should set the Address Type to either IPv4 Unnumbered or IPv6 Unnumbered. For IPv4, it must set the Downstream IP Address to 224.0.0.2; for IPv6 the address must be set to FF02::2. In both cases, the interface index must be set to 0. If an LSR receives an Echo Request packet with the all-routers multicast address, then this indicates that it must bypass both interface and label stack validation, but return Downstream Mapping TLVs using the information provided.

The Multipath Typefield specifies an additional multipath type if it differs from the one specified for the link bundle component interfaces specified in the Downstream Map TLV. The definition is the same as those from RFC4379.

Section 3 of RFC3479 contains a description of TLV types and values for LSP ping. The Downstream Mapping Link Bundle TLV will be assigned a Type value of 11.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. In a network comprising a plurality of routers and links interconnecting the plurality of routers, wherein the plurality of routers communicate using multiprotocol label switching, and wherein a link between two routers may be a link bundle comprising two or more component links, a method of revealing the component links of link bundles in the network, the method comprising:
    transmitting a sequence of request packets and reply packets along at least one path in the network, the at least one path comprising a series of links in the network, wherein a request packet is configured to request information about links downstream from an origination router of the plurality of routers,
    wherein the origination router is configured to transmit a request packet having as a destination a predetermined router, and wherein the predetermined router is configured to transmit a reply packet in response to receipt of the request packet,
    for each router in the plurality of routers that receives a request packet:
        identifying the received request packet as indicating that link bundles should be revealed;
        detecting which links connected to the router are link bundles; and
        for each detected link bundle, adding each component link in the link bundle to a downstream mapping field present in the received request packet and adding a link bundle mapping field to the received request packet, wherein each link bundle mapping field specifies the component links that comprise that link bundle
        by pointing to the component links added to the downstream mapping field; and
    for a router in the plurality of routers that is the predetermined router of a received request packet that responds to the received request packet with a reply packet that includes a downstream mapping field and at least one link bundle mapping field:
        determining if any links identified in the downstream mapping field of the reply packet are component links that belong to a link bundle;
        for each such determined link, identifying if a link bundle mapping field in the reply packet contains information regarding that link:
            if not, returning an error message; and
            if so, processing each component link in the downstream mapping field and iterating through the component links in each link bundle mapping field to ensure each component link in each link bundle mapping field matches the determined links in the downstream mapping field.

2. The method of claim 1 further comprising: for each detected link bundle, specifying in the link bundle mapping field an algorithm used by that link bundle.

3. The method of claim 1 further comprising:
    determining if the router sending the reply packet is a destination for packets belonging to a class of packets sent along the series of links; and
    if so, removing all link bundle mapping fields from the reply packet.

4. The method of claim 1 wherein the step of transmitting the sequence of request and reply packets further comprises: transmitting the sequence of request packets and reply packets along the series of links in the network, the series of links comprising a particular path in the network along which packets belonging to a class of packets travels.

5. The method of claim 1 wherein, for each detected link bundle, the step of adding each component link further comprises:
- adding each component link in the link bundle to a downstream mapping field present in the received request packet; and
- setting a flag in the downstream mapping field that identifies the link as a component link that is part of a link bundle.

6. The method of claim 5 wherein the step of determining if any links identified in the downstream mapping field of the reply packet are component links that belong to a link bundle further comprises: determining if any links identified in the downstream mapping field of the reply packet are component links that belong to a link bundle by examining the flag of each link.

7. The method of claim 5 further comprising: for each component link of each detected link bundle, setting a multipath field to identify how traffic is to be carried by the component link that is part of a link bundle.

8. A router for revealing component links within link bundles, wherein link bundles may be links interconnecting routers in a network comprising a plurality of routers, the router comprising:
- a network interface coupled to other routers;
- a memory operable to store instructions and data, the memory in communication with the network interface; and
- a processor coupled to the memory, the processor in communication with the network interface and with the memory, the processor responsive to the instructions;
- wherein the memory is encoded with a link bundle revealing application, that when executed in the processor, provides a link bundle revealing process that performs operations of:
  - transmitting a sequence of request packets and reply packets along at least one path in the network, the at least one path comprising a series of links in the network, wherein a request packet is configured to request information about links downstream from an origination router of the plurality of routers,
  - when the router is an origination router, the router is configured to transmit a request packet having as a destination a predetermined router, and wherein the predetermined router is configured to transmit a reply packet in response to receipt of the request packet
  - when the router is connected to downstream links and receives a request packet:
    - identifying the received request packet as indicating that link bundles should be revealed;
    - detecting which links connected to the router are link bundles; and
  - for each detected link bundle, adding each component link in the link bundle to a downstream mapping field present in the received request packet and adding a link bundle mapping field to the received request packet, wherein each link bundle mapping field specifies the component links that comprise that link bundle by pointing to the component links added to the downstream mapping field; and
  - when the router is the predetermined router that responds to a received request packet with a reply packet that includes a downstream mapping field and at least one link bundle mapping field:
    - determining if any links identified in the downstream mapping field of the reply packet are component links that belong to a link bundle;
    - for each such determined link, identifying if a link bundle mapping field in the reply packet contains information regarding that link; and
      - if not, returning an error message; and
      - if so, processing each component link in the downstream mapping field and iterating through the component links in each link bundle mapping field to ensure each component link in each link bundle mapping field matches the determined links in the downstream mapping field.

9. The router of claim 8 further comprising: for each detected link bundle, specifying in the link bundle mapping field an algorithm used by that link bundle.

10. The router of claim 8 further comprising:
- determining if the router that responds with the reply packet is a destination for packets belonging to a class of packets sent along a series of links; and
- if so, removing all link bundling mapping fields from the reply packet.

11. The router of claim 8 wherein, for each detected link bundle, adding each component link further comprises:
- adding each component link in the link bundle to a downstream mapping field present in the received request packet; and
- setting a flag in the downstream mapping field that identifies the link as a component link that is part of a link bundle.

12. The router of claim 11 wherein determining if any links identified in the downstream mapping field of the reply packet are component links that belong to a link bundle further comprises: determining if any links identified in the downstream mapping field of the reply packet are component links that belong to a link bundle by examining the flag of each link.

13. The router of claim 11 further comprising: for each component link of each detected link bundle, setting a multipath field to identify how a traffic is to be carried by the component link that is part of a link bundle.

14. In a network comprising a plurality of routers and links interconnecting the plurality of routers, wherein the plurality of routers communicate using multiprotocol label switching, and wherein a link between two routers of the plurality of routers may be a link bundle comprising two or more component links, a computer program product to reveal the component links of link bundles in the network, the computer program product stored on a non-transitory computer readable medium and comprising:
- computer program code for transmitting a sequence of request packets and reply packets along a series of links in the network comprising at least one path in the network, wherein a request packet is configured to request information about links downstream from an origination router of the plurality of routers, wherein the origination router is configured to transmit a request packet having as a destination a predetermined router, and wherein the predetermined router is configured to transmit a reply packet in response to receipt of the request packet;
- for a router in the plurality of routers that is connected to downstream links that receives a request packet:
  - computer program code for identifying the received request packet as indicating that link bundles should be revealed;
  - computer program code for detecting which links connected to the router are link bundles; and
  - for each detected link bundle, computer program code for adding each component link in the link bundle to a downstream mapping field present in the received request packet and computer program code for adding a link bundle mapping field to the received request packet, wherein each link bundle mapping field specifies the component links that comprise that link bundle by pointing to the component links added to the downstream mapping field; and for a router in the plurality of routers that is the predetermined router of the received request packet that responds to the received request packet with a reply packet that includes a downstream mapping field and at least one link bundle mapping field:

computer program code for determining if any links identified in the downstream mapping field of the reply packet are component links that belong to a link bundle;

for each such determined link, computer program code for identifying if a link bundle mapping field in the reply packet contains information regarding that link and if not, computer program code for returning an error message; and if so, computer program code for processing each component link in the downstream mapping field and computer program code for iterating through the component links in each link bundle mapping field to ensure each component link in each link bundle mapping field matches the determined links in the downstream mapping field.

15. The computer program product of claim 14 further comprising: for each detected link bundle, computer program code for specifying in the link bundle mapping field an algorithm used by that link bundle.

16. The computer program product of claim 14 further comprising: computer program code for determining if the router sending the reply packet is a destination for packets belonging to a class of packets sent along the series of links; and if so, computer program code for removing all link bundling mapping fields from the reply packet.

17. The computer program product of claim 14 wherein computer program code for transmitting further comprises: computer program code for transmitting a sequence of request packets and reply packets along the series of links in the network, the series of links comprising a particular path in the network along which packets belonging to a class of packets travels.

18. The computer program product of claim 14 wherein, for each detected link bundle, the computer program code— for adding each—component link further comprises:

computer program code for adding each component link in the link bundle to a downstream mapping field present in the received request packet; and computer program code for setting a flag in the downstream mapping field that identifies the link as a component link that is part of a link bundle.

19. The computer program product of claim 18 wherein computer program code for determining if any links identified in the downstream mapping field of the reply packet are component links that belong to a link bundle further comprises: computer program code for determining if any links identified in the downstream mapping field of the reply packet are component links that belong to a link bundle by examining the flag of each link.

20. The computer program product of claim 18 further comprising: for each component link of each detected link bundle, computer program code for setting a multipath field to identify how a traffic is to be carried by the component link that is part of a link bundle.

* * * * *